UNITED STATES PATENT OFFICE 2,244,733

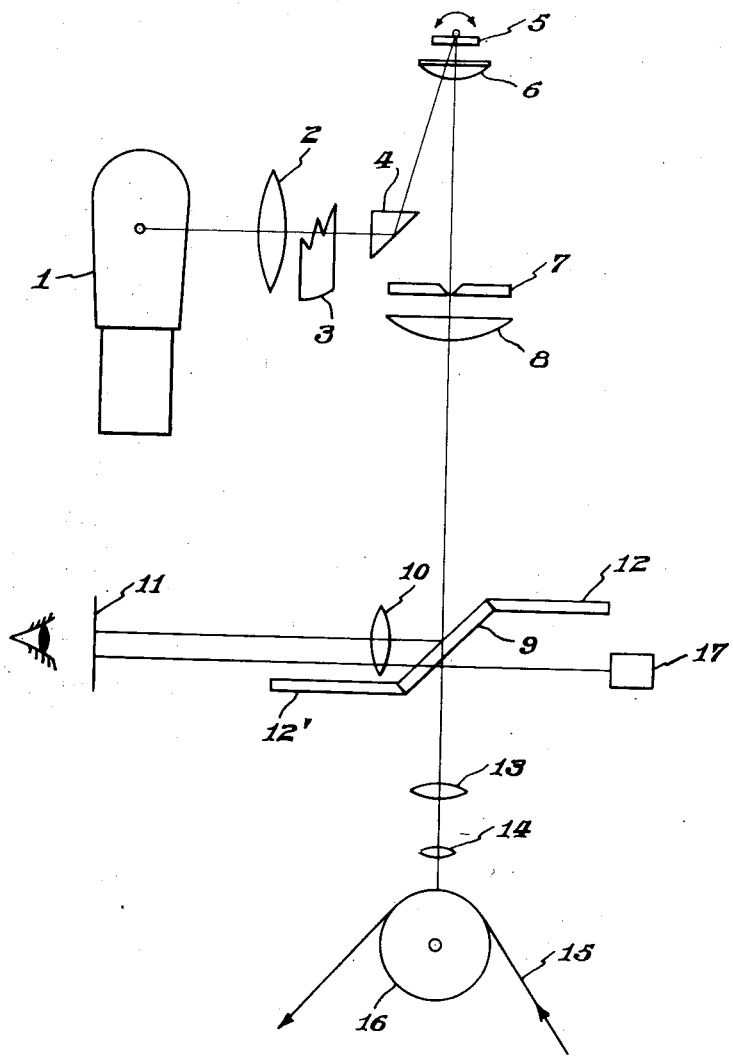

SOUND RECORDING APPARATUS

Karl Schwarz, Berlin-Lankwitz, Germany, assignor to Klangfilm G. m. b. H., Berlin, Germany, a corporation of Germany Application June 24, 1938, Serial No. 215,625
In Germany July 28, 1937

1 Claim. (Cl. 179—100.3)

This invention relates to an improved sound film recording apparatus and more particularly to apparatus for visually monitoring the recording light during the recording operation.

Monitoring of the recording plate has heretofore been accomplished by means of a sliding glass plate in the path of the recording light beam. This glass plate was usually arranged at an angle of 45° to the optical axis and in such a location that a portion of the recording light directed toward the film from the recording galvanometer was reflected and directed to an observing device, the main portion of the light going through the glass plate and making a record on the film. With such an arrangement, light reflected from the film was similarly reflected from the opposite face of the glass plate and could be directed by an appropriate mirror to the same observing device so that at the observation point both the recording slit and the image of the slit upon the film could be observed.

This arrangement had the disadvantage that because of the finite thickness of the slanting glass plate, light was reflected from both the front and back of the plate with the result that two images of either the slot or the image thereof on the film appeared almost in super-position in the observing device, these images being displaced an amount determined by the thickness of the glass plate.

Recording by ultra violet light has recently come into general commercial use and, in such recording, a glass filter of appropriate thickness has usually been inserted in a plane perpendicular to the optical axis of the system, this filter serving to transmit only the desired portion of the spectrum to the film. When such a filter was used in conjunction with the type of observing device heretofore referred to, considerable light loss resulted both at the filter and at the observing device.

In the present invention, I provide for ultra violet recording and also for visual monitoring of the recording beam and avoid the disadvantages of both of the aforesaid constructions by using the slanting glass plate as the ultra violet filter. When the ray which passes through the recording slit strikes this filter plate, part of the visible light is reflected from the incident surface of the plate to the observing device. There is no reflection, however, from the bottom surface of the filter plate since the visible light is absorbed by the ultra violet filter. Double images are thereby avoided and the double loss of light in passing through the diagonal mirror and the ultra violet filter is also avoided. The ultra violet light passing through the diagonal glass plate falls on the film and makes the record there as heretofore.

In order to prevent visible light falling on the film, appropriate screens may be provided around the diagonal ultra violet filter or the entire optical system may be appropriately enclosed in a tube of the customary type. Another feature of the invention provides for observation of the slit image upon the film by directing the invisible ultra violet light reflected by the film to an appropriate fluorescent screen which may have, for example, a coat of zinc sulphide. The observation screen for the visual beam may be coated with zinc sulphide and both the visible, and ultra violet light may be observed upon the same screen, or a separate observing device for the ultra violet light may be provided, if desired.

An alternative construction is to provide an appropriate fluorescent layer on the entire surface of the recording film or on such portions thereof as it may be desired to use for the purpose of focusing or checking the modulation on the film. This fluorescent layer may be removed when the film is developed so that no additional processing cost is involved and no special apparatus is required. If desired, the fluorescent layer may be applied only to the sound track area. In this form of the invention the luminous image on the fluorescent layer of the film is reflected from the slanting glass plate which serves as an ultra violet filter and directed through an appropriate reflecting device to the observing device, or is directed to a separate observing device.

One object of the invention is to provide an improved visual monitoring device for sound recording apparatus.

Another object of the invention is to provide an improved ultra violet filter construction for sound recording apparatus.

Another object of the invention is to provide an improved combined visual monitoring device and ultra violet filter for sound recording apparatus.

Another object of the invention is to provide an improved visual monitoring device for sound recording apparatus which will provide a minimum loss of light.

Another object of the invention is to provide an improved visual monitoring means for ultra violet sound recording.

Other and incidental objects of my invention will be apparent to those skilled in the art from a reading of the following specification and an inspection of the accompanying drawing in which the single figure of drawing is a schematic sectional view of my recording optical system.

In the drawing the usual exciter lamp is indicated at 1. Light from this lamp passes through the condenser lens 2 and past a toothed diaphragm 3 to the deflecting prism 4, which directs it through the lens 6 upon the galvanometer mirror 5 which vibrates about an axis perpendicular to the plane of the paper. Light emerges from the mirror 5 and passes again through the lens 6, which directs it to the slit plate 7. The lens 6 forms an image of the toothed diaphragm 3 upon the slit plate 7, which image is vibrated by the galvanometer 5 in accordance with the sound waves to be recorded, thereby producing an appropriately variable light image on the slit in the plate 7. Light emerging from the slit in the plate 7 passes through the converging lens 8 to the slanting glass plate 9 which is composed of such material as to form an appropriate ultra violet filter. A portion of the light is reflected by the upper surface of the plate 9 and directed by the lens 10 to an appropriate observing screen 11. The main portion of the recording light goes through the ultra violet filter 9 and is focused by the objective 13, 14 upon the film 15 which runs over the roller 16.

Since the thickness of ultra violet filters is generally specified for vertically incident rays, it is necessary to make an appropriate correction of the filter thickness to compensate for the slanting position. In the form of the invention shown, the filter is placed at an angle of 45° and the correction is accordingly accomplished by grinding down the thickness of the filter in the ratio of $1:\sqrt{2}$. If the filter is to be placed at some other angle than 45°, the thickness must be altered by a corresponding amount so that the distance the light travels through the filter material remains the amount specified for filter thickness with perpendicularly incident light.

If the film 15 is provided with fluorescent material on its surface, a visible image of the slit image on the film can be thrown on the observing screen 11 by means of an appropriate deflecting prism 17 which carries the reflected beam to a position where it will pass the ultra violet filter 9 and enter the lens 10. If the film is not fluorescent, the prism 17 may reflect the beam reflected from the back surface of the filter 9 again through the filter 9 and lens 10 to the observing screen 11 which, in this case, will be coated with an appropriate luminous substance, such as zinc sulphide.

For the purpose of keeping diffused light from reaching the film, two opaque screens 12 and 12' may be arranged adjacent the glass plate 9.

Having now described my invention, I claim:

Sound recording apparatus including means for directing a beam of recording light to a film, means for supporting the film at the recording point, a slanting glass plate constituting an ultra violet filter in the path of said beam, and optical means for observing light reflected by said plate, whereby light emitted by a fluorescent film when ultra violet light is directed thereon may be observed.

KARL SCHWARZ.